(12) United States Patent
Han et al.

(10) Patent No.: US 8,931,274 B2
(45) Date of Patent: Jan. 13, 2015

(54) ENGINE SYSTEM BASED ON TURBO CHARGER AND FUEL RATIO IMPROVING METHOD THEREOF

(75) Inventors: Donghee Han, Hwaseong-si (KR); Dongho Chu, Ansan-si (KR); Yoonjoo Kim, Seoul (KR); Jongil Park, Seoul (KR); Hongjip Kim, Hwaseong-si (KR); Seungkook Han, Suwon-si (KR); Hyuk Im, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 582 days.

(21) Appl. No.: 13/285,959

(22) Filed: Oct. 31, 2011

(65) Prior Publication Data
US 2012/0285165 A1 Nov. 15, 2012

(30) Foreign Application Priority Data
May 11, 2011 (KR) .................. 10-2011-0043833

(51) Int. Cl.
*F02B 33/44* (2006.01)
*F02B 33/00* (2006.01)
(Continued)

(52) U.S. Cl.
CPC .............. *F02C 6/12* (2013.01); *F01D 17/141* (2013.01); *F02C 7/057* (2013.01);
(Continued)

(58) Field of Classification Search
CPC ...... F02B 37/04; F02B 37/16; F02B 29/0406; F01D 17/141; F02C 6/12; F02C 7/057; F02M 25/0709; F02M 25/0711; F02M 25/0713; F02M 25/0724; F02M 25/0786; F02M 35/10157; F02M 35/10163; F02M 35/108; Y02T 10/121; Y02T 10/144

USPC ................. 123/562, 564; 60/612, 611, 605.2, 60/607–609
IPC ............ F02B 37/00,37/04, 37/16, 37/18, 37/22, F02B 29/04; F02M 25/07
See application file for complete search history.

(56) References Cited

U.S. PATENT DOCUMENTS 4,466,414 A * 8/1984 Yoshimura et al. ........... 123/564
4,870,822 A * 10/1989 Kamimaru ...................... 60/611
(Continued)

FOREIGN PATENT DOCUMENTS

JP 2005220822 A * 8/2005 .............. F02B 37/04
JP 2007-127070 A 5/2007
(Continued)

OTHER PUBLICATIONS

A machine translation of the reference to Ishikawa Naoya (Pub. No. JP 2011-001877 A), published on Jan. 6, 2011.*

*Primary Examiner* — Thai Ba Trieu
(74) *Attorney, Agent, or Firm* — Morgan, Lewis & Bockius LLP (57) ABSTRACT

An engine system may include an electric or mechanical supercharger and an LP-EGR, basically with a turbocharger, an EGR valve, a channel control valve, and a bypass valve, which control the flow rate of external air and exhaust gas, may be integrally operated, and a operation section may be divided into a turbo-lag and low torque section, a mid-load section, and mid/high-load section such that the open amount of EGR valve, channel control valve, and bypass valve may be optimally controlled, such that it may be possible to improve availability for a low-speed/high-load section with turbo-lag reduced, using supercharger and considerably increase the ratio of fuel efficiency improvement in the low-speed/high-load section, using LP-EGR operating with supercharger.

14 Claims, 8 Drawing Sheets

(51) Int. Cl.
    *F02M 25/07*          (2006.01)
    *F02C 6/12*           (2006.01)
    *F01D 17/14*          (2006.01)
    *F02C 7/057*          (2006.01)
    *F02M 35/10*          (2006.01)
    *F02M 35/108*        (2006.01)
    *F02B 37/04*          (2006.01)
    *F02B 37/16*          (2006.01)
    *F02B 29/04*          (2006.01)

(52) U.S. Cl.
    CPC ...... *F02M 25/0711* (2013.01); *F02M 25/0713* (2013.01); *F02M 25/0724* (2013.01); *F02M 25/0786* (2013.01); *F02M 35/10163* (2013.01); *F02M 35/108* (2013.01); *F02B 37/04* (2013.01); *F02B 37/16* (2013.01); *F02B 29/0406* (2013.01); *Y02T 10/121* (2013.01); *Y02T 10/144* (2013.01)
    USPC ............... 60/612; 60/611; 60/607; 60/605.2; 123/562; 123/564

(56) References Cited

U.S. PATENT DOCUMENTS

| | | | |
|---|---|---|---|
| 6,343,473 B1 * | 2/2002 | Kanesaka | 60/609 |
| 6,742,335 B2 * | 6/2004 | Beck et al. | 60/605.2 |
| 6,889,503 B2 * | 5/2005 | Hoecker et al. | 60/612 |
| 6,920,755 B2 * | 7/2005 | Hoecker et al. | 60/612 |
| 7,426,830 B2 * | 9/2008 | Schorn et al. | 60/605.2 |
| 7,530,229 B2 * | 5/2009 | Akita | 60/605.2 |

FOREIGN PATENT DOCUMENTS

| | | | | |
|---|---|---|---|---|
| JP | 2007-263040 A | 10/2007 | | |
| JP | 2009-108693 A | 5/2009 | | |
| JP | 2009115089 A * | 5/2009 | | F02B 37/04 |
| JP | 2009-222007 A | 10/2009 | | |
| JP | 2010-038055 A | 2/2010 | | |
| JP | 2011-001877 A | 1/2011 | | |
| JP | 2011-007051 A | 1/2011 | | |
| JP | 2012136957 A * | 7/2012 | | F02B 37/04 |
| KR | 10-2009-0128512 A | 12/2009 | | |

* cited by examiner

ENGINE SYSTEM BASED ON TURBO CHARGER AND FUEL RATIO IMPROVING METHOD THEREOF

CROSS-REFERENCE TO RELATED APPLICATIONS

The present application claims priority to Korean Patent Application Number 10-2011-0043833 filed May 11, 2011, the entire contents of which application is incorporated herein for all purposes by this reference.

BACKGROUND OF THE INVENTION

1. Field of the Invention

The present invention relates to a turbocharger-based engine system, and more particularly, to a turbocharger-based engine system that optimizes a synergy effect of a plurality of separate devices for improving engine performance without detracting the layout of an engine room by combining the functions of the devices, and a method of improving fuel efficiency using the turbocharger-based engine system.

2. Description of Related Art

In general, vehicles are equipped with various devices for improving engine performance and fuel efficiency.

A turbocharger, which is a typical device, contributes to improving the performance and fuel efficiency of an engine by compressing the intake air supplied into the engine, using the exhaust gas.

However, it is difficult to appropriately keep up with a demand for saving fuel and improving fuel efficiency which has increased with the rise of issues, such as global high oil price, and improvement of fuel efficiency and environment-friendly technology under a variety of regulations, only with the turbocharger.

As an example for the issues, a supercharger, which is used with the turbocharger, may be considered. A belt-driven mechanical supercharger, a typical supercharger, is composed of a bypass control valve and a magnetic clutch.

When an engine system is composed of a turbocharger and a super charger, the bypass control valve is closed and the magnetic clutch is engaged such that the supercharger and the turbocharger are connected, and the turbocharger and the supercharger are simultaneously operated to suck air in series in a low-speed turbo-lag section, while the magnetic clutch is disengaged and the bypass control valve is opened such that air is sucked, not through the supercharger, in a normal driving condition.

In the engine system composed of the turbocharger and the supercharger, as described above, it is possible to improve the response speed and low torque of a spark-ignition engine equipped with a turbocharger by making the operation state of the supercharger different in accordance with the driving conditions.

As described above, however, the belt-driven mechanical supercharger, which is a typical supercharger, needs a valve and a clutch, such that the engine system is necessarily complicated.

On the other hand, another typical device that improves engine performance together with a turbocharger is an EGR (Exhaust Gas Recirculation), an exhaust gas recirculation system.

The EGR contributes to improving engine performance by operating the turbocharger with the exhaust gas discharged to the outside from the engine such that the intake air that is supplied into the engine is compressed and some of the exhaust gas is supplied back into the engine.

In general, the EGR falls into an HP-EGR (High Pressure EGR) that takes the exhaust gas (or called an EGR gas) before the turbocharger and an LP-EGR (Low Pressure EGR) that takes the exhaust gas behind the turbocharger.

The LP-EGR has the advantage of making it possible to use relatively clean exhaust gas with pollutants filtered through a TWC (Three Way Catalytic Converter) or a DPF (Diesel Particulate Filter), at low pressure/low temperature, unlike the HP-EGR, by sending some of the exhaust gas, which has passed through the TWC or the DPF after flowing out of an exhaust manifold through a turbocharger, to the front end of a compressor of the turbocharger such that the exhaust gas flow with the intake air into the intake manifold.

As described above, there are a turbocharger, a supercharger, and an EGR (particularly, LP-EGR) as devices that remarkably increase engine performance in an engine system and an engine system equipped with an appropriate combination of the devices (turbocharger+supercharger or turbocharger+LP-EGR) can be considerably increased in performance.

Therefore, it is possible to contribute to optimizing the engine system if it is possible to maximize the advantages of the device by using all of the turbocharger, supercharger, and LP-EGR in the engine system.

However, it is difficult to achieve optimum control that can increase the synergy effect of the devices when implementing the operation using the turbocharger, supercharger, and LP-EGR, which have individual operational features, and the configuration of the engine system equipped with the supercharger and the LP-EGR, which have complicate configurations, becomes necessarily complicated.

The complicate engine system significantly restricts the layout of an engine room, such that it is necessarily very difficult to simultaneously use a turbocharger, a supercharger, and an LP-EGR.

The information disclosed in this Background of the Invention section is only for enhancement of understanding of the general background of the invention and should not be taken as an acknowledgement or any form of suggestion that this information faints the prior art already known to a person skilled in the art.

BRIEF SUMMARY

Various aspects of the present invention are directed to providing a turbocharger-based engine system that can implement a down-sized engine system that prevents deterioration of the layout of an engine room due to complication of the components in a supercharger and an LP-EGR (Low Pressure EGR), increase the synergy effect of the devices when operating the system by keeping the functions and implementing optimum control, and particularly, considerably contribute to improving fuel efficiency for a low-speed/high-load section, and a method of improving fuel efficiency using the turbocharger-based engine system.

In an aspect of, a turbocharger-based engine system may include an intake system that includes an air cleaner and supplies an external air into an engine, an exhaust system that includes at least one or more filter and discharges an exhaust gas discharged from the engine to the outside, a turbocharger that may be operated by the exhaust gas and oversupplies the external air supplied into the air cleaner, a supercharger that forms another flow or external air diverging from an external air flow section of the intake system, an Exhaust Gas Recirculation (EGR) system that includes an EGR line connecting the exhaust system to a compressor of the turbocharger to send the flow of the exhaust gas diverging from the exhaust system to the turbocharger, and a valve unit that changes a mixing ratio of the exhaust gas and the external gas oversupplied through the turbocharger by changing the flow of the external air, the another flow of external air, and the flow of the exhaust gas at the front end of the compressor in the turbocharger by control of an Engine Control Unit (ECU).

The supercharger forms the another flow of external air diverging from the flow of the external air that may be formed at a rear end of the air cleaner of the intake system and directly sends the flow of external air to the EGR line of the EGR.

The supercharger may be an electric supercharger.

The supercharger forms the another flow of external air diverging from the flow of the external air that may be formed at a rear end of the air cleaner of the intake system and connects the flow of external air from an intake connection line diverging from the supercharger to the EGR line of the EGR.

The supercharger may be a mechanical supercharger using the power from the engine.

The EGR may be a LP-EGR (Low Pressure EGR) and the EGR line diverges from a rear end of the filter of the exhaust system and further includes an emergency filter.

The valve unit includes an EGR valve that selectively allows the exhaust gas diverging from an exhaust line fluid-connected to the turbocharger to flow to the EGR line, a bypass valve that allows the external air introduced through an intake line of the intake system to flow to the EGR line, wherein the air cleaner may be fluid-connected to the intake line, and a channel control valve that allows the another flow of external air sucked through the supercharger to send to the EGR line.

The EGR valve and the channel control valve may be integrally opened/closed in the opposite way and the bypass valve may be independently opened/close wherein the EGR valve and the channel control valve may be operated by a valve operating unit that may be controlled by the ECU.

The valve operating unit includes an actuator that directly changes the open amount of any one of the EGR valve and the channel control valve, and a valve link that connects the EGR valve or the channel control valve to both ends such that the other valve may be closed when any one of the valves may be opened.

The valve operating unit includes a valve link that connects the EGR valve or the channel control valve to both ends such that the other valve may be closed when any one of the valves may be opened, and an actuator that directly operates the valve link.

In another aspect of, a method of improving fuel efficiency by using a turbocharger-based engine system, may include a) detecting vehicle information according to an operation of an engine and determining an engine operation section from the acquired vehicle information, b) dividing the engine operation section into a turbo-lag and low torque section, a mid-load section, and a mid/high-load section, c) supplying only an external air flowing through a supercharger into the engine in the turbo-lag and low torque section, supplying a gas mixture of external air flowing through an intake system with one of external air flowing through the supercharger and the exhaust gas flowing through an Exhaust Gas Recirculation (EGR) into the engine in the mid-load section, and supplying a gas mixture of the exhaust gas flowing through the EGR with the external air flowing through the intake system into the engine, without introducing another external air through the supercharger in the mid/high-load section, and d) returning to the step of a) after the step of c).

The supercharger fully opens a channel control valve at the joint of the EGR line to allow all the external air sucked from the intake system to pass, while the supercharger fully closes a bypass valve at the joint of the EGR line where the intake system may be connected, and fully closes the EGR valve in the EGR line, in the turbo-lag and low torque section.

A bypass valve at the joint of the EGR line where the intake system may be connected may be fully opened in the mid-load section, while an EGR valve disposed in the EGR line may be fully opened or operated in the opposite way when a channel control valve at the joint of the EGR line where the supercharger may be connected may be fully closed, wherein when the channel control valve or the EGR valve may be fully opened, the channel control valve or the EGR valve may be gradually fully closed again.

An EGR valve disposed in the EGR line may be fully opened in the mid/high-load section, while a channel control valve at the joint of the EGR line where the supercharger may be connected may be fully closed and a bypass valve that has been fully closed at the joint of the EGR line where the intake system is connected may be gradually fully opened.

The present invention has the advantage of implementing a down-sized engine system that prevents deterioration of the layout of an engine room due to complication of the components in a supercharger and an LP-EGR, based on a turbocharger.

The present invention has the advantage of implementing various driving modes by including a turbocharger, a supercharger, and an LP-EGR, and easily implementing optimum control from the various driving modes.

The present invention has the advantage of improving availability for a low-speed/high-load section by reducing turbo-lag with the supercharger operating with the turbocharger, and significantly improving fuel efficiency with synergy effect of the turbocharger, the supercharger, and the LP-EGR by reducing fuel consumption in the low-speed/high-load section with the LP-EGR operating with the supercharger.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

Figure 1:
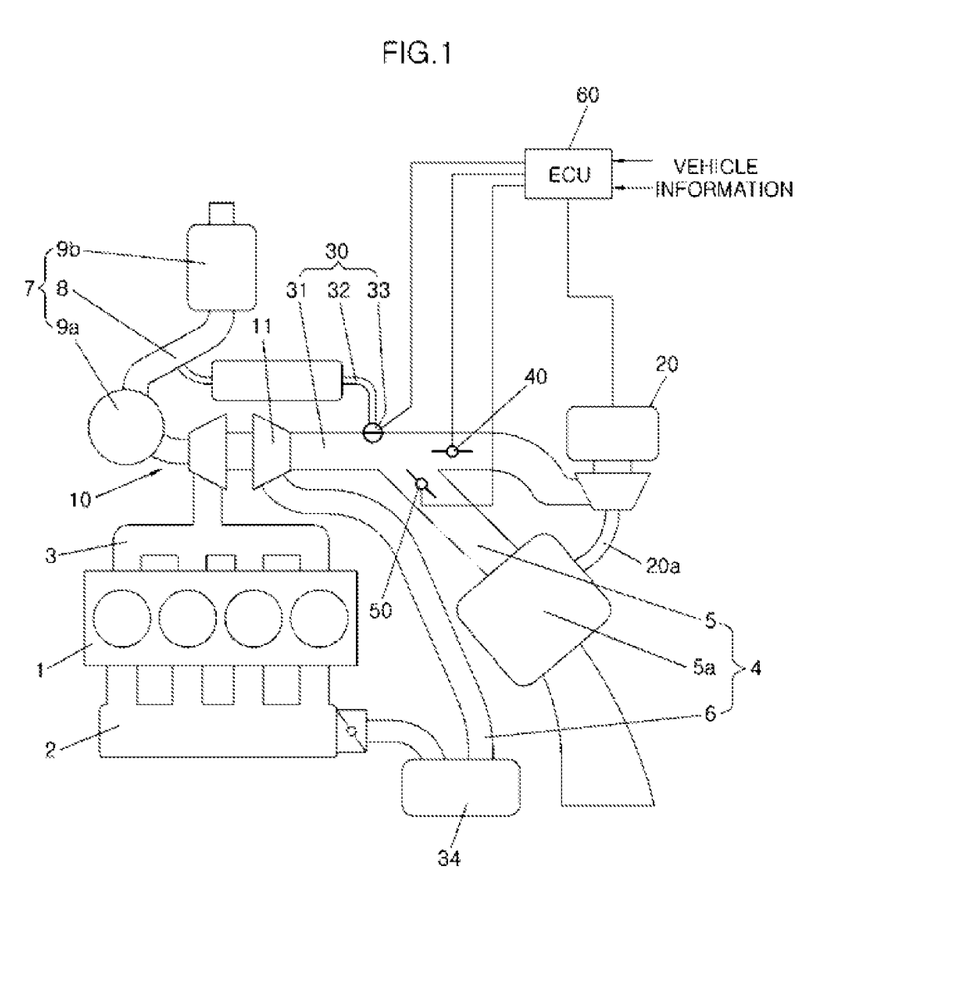
FIG. 1 is a view showing the configuration of a turbocharger-based engine system according to various exemplary embodiments of the present invention.

Referring to FIG. 1, an engine system includes: an engine 1 that is a power source, an intake system 4 that introduces the external air into engine 1, an exhaust system 7 that discharges an exhaust gas from engine 1 to the outside, a turbocharger 10 that oversupplies the external air introduced into engine 1 with the exhaust gas, a supercharger 20 that introduces another external air diverging from intake system 4 to improve the response speed and low torque of a spark ignition engine in a low-speed turbo-lag section, an LP-EGR 30 that introduces a relatively clean exhaust gas with pollutants filtered through a filter (DPF), at low pressure/low temperature, a valve unit that controls the flow of the external air introduced into intake system 4, the flow of the exhaust gas introduced into LP-EGR 30, and the flow of another external air introduced into supercharger 20, and an ECU 60 that controls the open amount of engine 1, supercharger 20, and the valve unit.

Intake system 4 includes an intake line 5 with an air cleaner 5a filtering pollutants from the external air, an intake pipe 6 forming the flow of the external air oversupplied from turbocharger 10 in intake line 5 and has a throttle body controlling the flow rate of the external air introduced into engine 1, and an intake manifold 2 directly connected to engine 1.

Intake pipe 6 is equipped with a high-efficiency intercooler 34 that decreases the temperature of the gas mixture oversupplied due to turbocharger 10.

Exhaust system 7 includes an exhaust line 8 extending from exhaust manifold 3 directly connected to engine 1 and at least one or more filters 9a and 9b disposed in exhaust line 8 to filter pollutants from the exhaust gas.

In turbocharger 10, a turbine is connected to exhaust line 8 through which the exhaust gas flows while a compressor is connected to intake pipe 6 through which the external air is introduced, with an EGR line 31 through which the exhaust gas is introduced.

Supercharge 20 is an electric supercharger with a motor controlled by ECU 60 and disposed in an intake diverging line 20a diverging from intake system 4 to LP-EGR 30.

Intake diverging line 20a diverges from the outlet of air cleaner 5a of intake system 4 or intake line 5 behind air cleaner 5a and is connected to EGR line 31 of LP-EGR 30 connected to the compressor 11 of turbocharger 10.

LP-EGR 30 includes an EGR line 31 connected to the compressor 11 of turbocharger 10 to introduce the exhaust gas, an EGR diverging line 32 diverging from the exhaust line and allowing the exhaust gas to flow to EGR line 31, and an EGR valve 33 disposed at the joint of EGR diverging line 32 and EGR line 31 and controlled by ECU 60.

EGR diverging line 32 diverges from exhaust line 8 at the rear end of at least one of the pair of filters 9a and 9b of exhaust system 7.

An emergency filter that purifies the exhaust gas may be further disposed in EGR diverging line 32.

Meanwhile, the valve unit includes an EGR valve 33 allowing the exhaust gas diverging from the exhaust line to flow to EGR line 31, a channel control valve 40 allowing the external air introduced through supercharger 20 to flow to EGR line 31, and a bypass valve 50 allowing the external air introduced through intake line 5 to EGR line 31.

EGR valve 33, channel control valve 40, and bypass valve 50 change the flow rate by the control of the open amount of ECU 60.

EGR valve 33 is disposed at the joint of EGR diverging line 32 and EGR line 31, channel control valve 40 is disposed at the joint of intake diverging line 20a and EGR line 31, and bypass valve 50 is disposed at the joint of intake line 5 and EGR line 31.

In the exemplary embodiment, channel control valve 40 and bypass valve 50 are disposed at the rear end of EGR valve closest to turbocharger 10, with respect to turbocharger 10.

Figure 2:
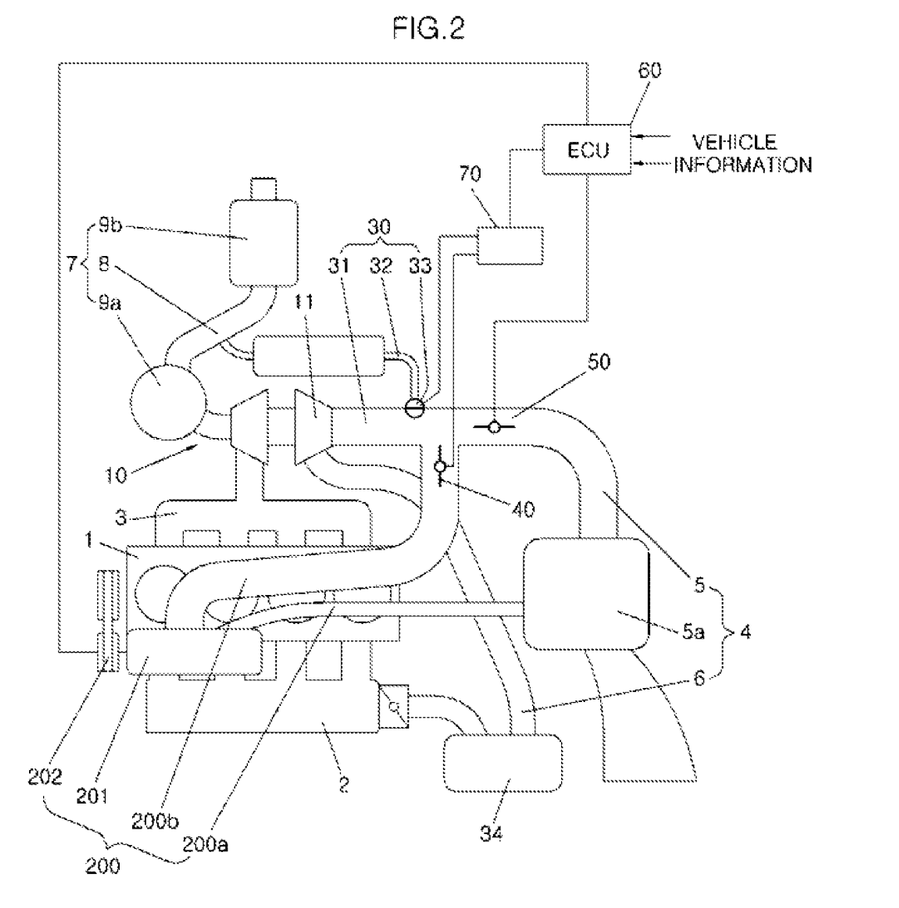
FIG. 2 is a view showing the configuration of a turbocharger-based engine system according to various exemplary embodiments of the present invention.

FIG. 2 is a view showing the configuration of a turbocharger-based engine system according to a second exemplary embodiment of the present invention, which includes a mechanical supercharger using a clutch and a belt.

As shown in the figure, the engine system includes: an intake system 4 that introduces the external air into engine 1, an exhaust system 7 that discharged an exhaust gas from engine 1 to the outside, a turbocharger 10 that is operated by the exhaust gas and oversupplies the external air introduced into engine 1, and an LP-EGR 30 that introduces a relatively clean exhaust gas with pollutants filtered through a filter (DPF), at low pressure/low temperature, however, unlike electric supercharger 20, the layout of the engine room is necessarily changed for the features of mechanical supercharger 200 using power from engine 1.

That is, mechanical supercharger 200 is disposed close to engine 1 because a magnetic clutch 201 and power transmission belt 202 are disposed at the front portion of engine 1.

Therefore, mechanical supercharger 200 further includes an intake connection line 200b that sends the intake external air to EGR line 31, other than intake diverging line 200a through which the external air flows inside.

Intake diverging line 200a diverges from the outlet of an air cleaner 5a of intake system 4 or an intake line 5 behind air cleaner 5a and is connected to mechanical supercharger 200 across engine 1 and intake connection line 200b is connected to EGR line 31 from mechanical supercharger 200 across engine 1.

Accordingly, intake line 5 introducing the external air is directly connected to EGR line introducing the exhaust gas, in intake system 4.

The valve unit composed of an EGR valve 33, a channel control valve 40, and a bypass valve 50, which is the same as electric supercharger 20.

EGR valve 33 is disposed at the joint of EGR diverging line 32 and EGR line 31, channel control valve 40 is disposed at the joint of intake connection line 200*b* and EGR line 31, and bypass valve 50 is disposed at the joint of intake line 5 and EGR line 31.

ECU 60 controls the open amount of engine 1, mechanical supercharger 200, and the valve unit.

Figure 3:
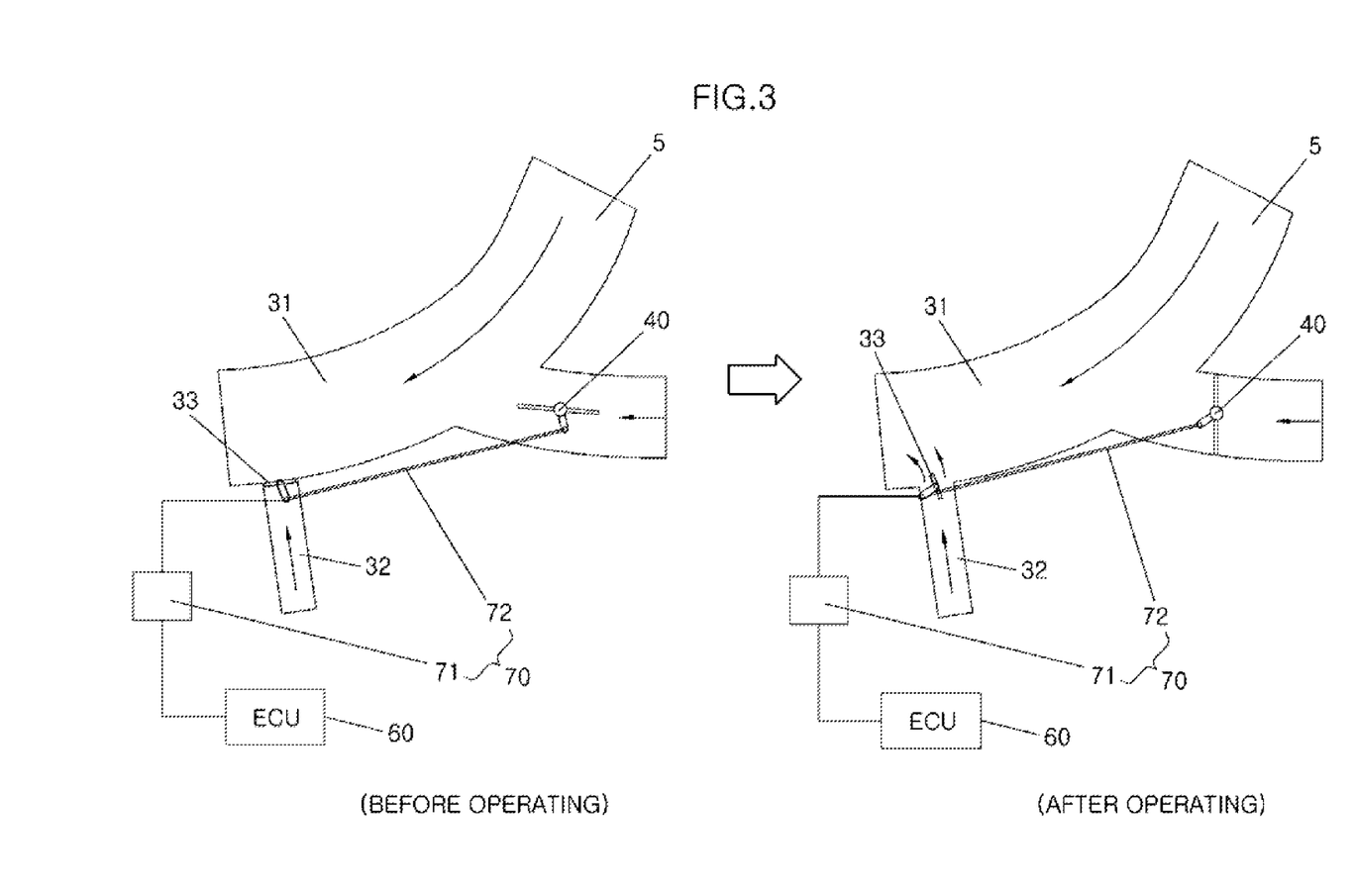
FIGS. 3 to 5 are views showing various modified examples of a valve operating unit in the turbocharger-based engine system according to an exemplary embodiment of the present invention.
Figure 4:
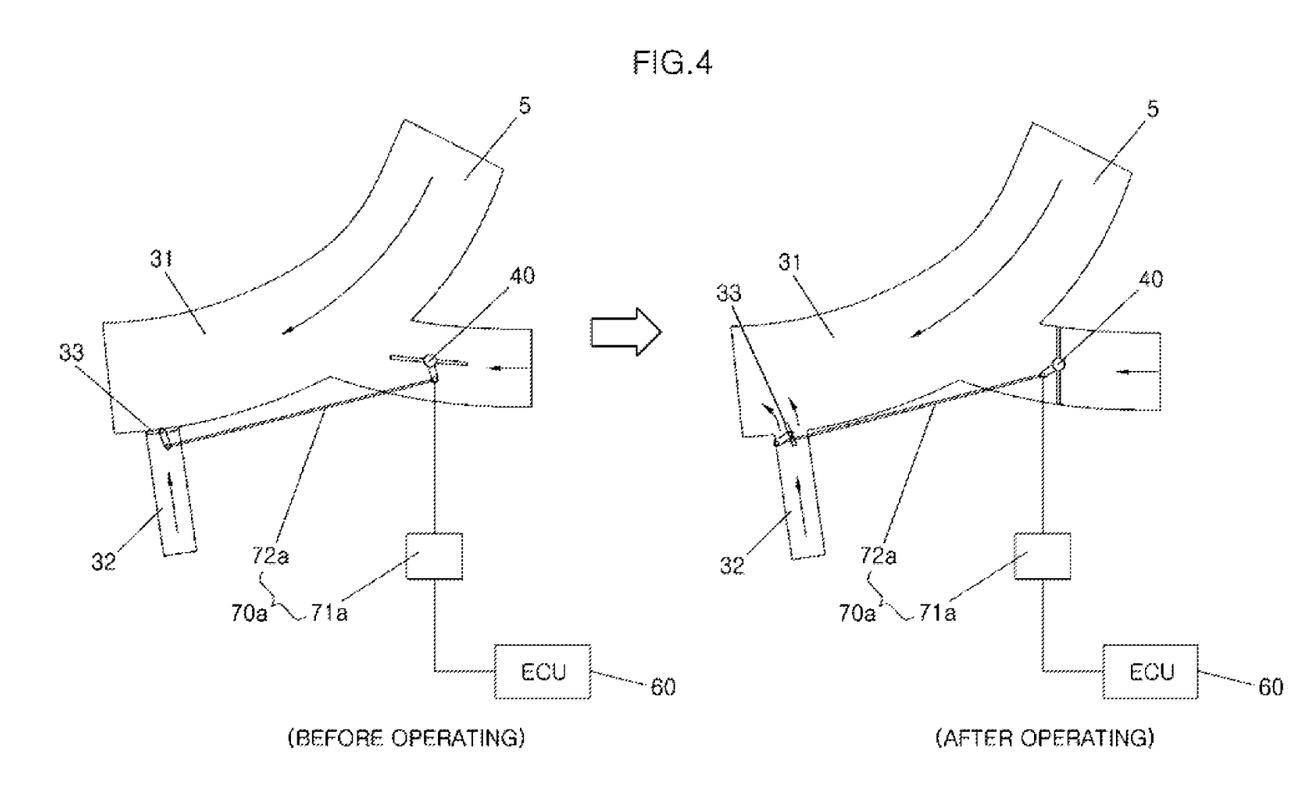
Figure 5:
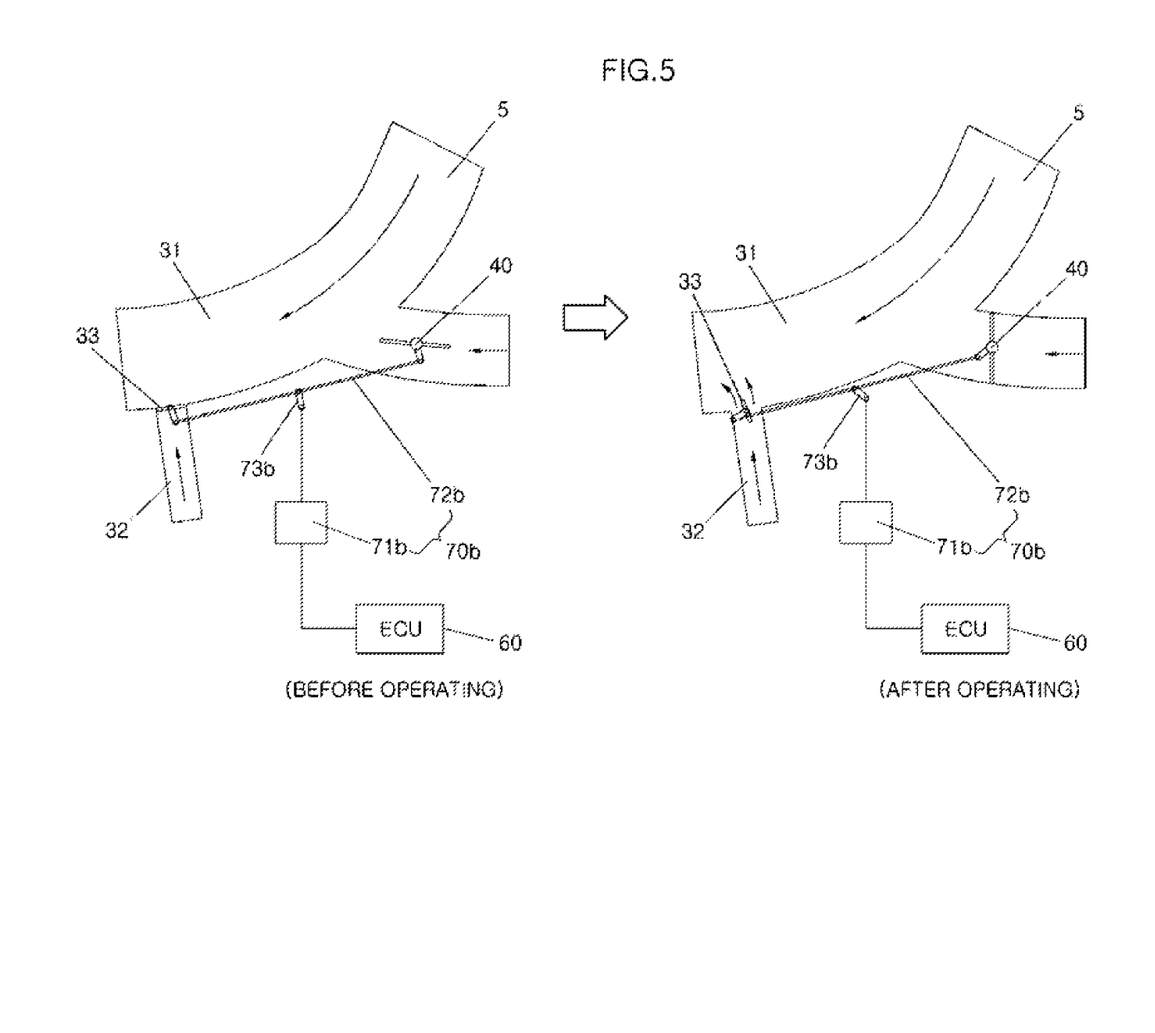

FIGS. 3 to 5 shows various modified examples of the valve operating unit in the first exemplary embodiment and the second exemplary embodiment of the present invention, in which the valve operating unit operates in a way for improving convenience of control by integrally operating EGR valve 33 and channel control valve 40.

The valve operating unit moves EGR valve 33 and channel control valve 40 in the opposite way, and for example, as EGR valve 33 is opened, channel control valve 40 closes, corresponding to the movement.

The valve operating unit shown in FIG. 3 includes a valve controller 70 that integrally moves EGR valve 33 and channel control valve 40, and ECU 60 controlling the valve controller 70.

Valve controller 70 includes an actuator 71 coupled to a flap of EGR valve 33 and changing the open amount of EGR valve 33 by control of ECU 60 and a valve link 72 extending from the flap of EGR valve 33 and connected to a flap of channel control valve 40.

Both ends of valve link 72 are preferably hinged.

The post-operation state of FIG. 3 shows when EGR valve 33 is fully open and channel control valve 40 is fully closed.

Actuator 71 operated by ECU 60, as described above, directly changes the open amount of EGR valve 33 and the movement of EGR valve 33 is transmitted to channel control valve 40 through valve link 72, such that the open amount of channel control valve 40 can be correspondingly changed.

FIG. 4 shows a modified example of the valve operating unit, in which an actuator 71*a* controlled by an ECU 60 is directly connected to a channel control valve 40 and an EGR valve 33 is connected to a valve link 72*a*.

In this case, actuator 71*a* operated by ECU 60 directly changes the open amount of channel control valve 40 and the movement of channel control valve 40 is transmitted to EGR valve 33 through a valve link 72*a*, such that the open amount of EGR valve 33 can be correspondingly changed.

The post-operation state of FIG. 4 shows when channel control valve 40 is fully closed and EGR valve 33 is fully open.

FIG. 5A shows another modified example of the valve operating unit, in which an EGR valve 33 and a channel control valve 40 are connected to both ends of a valve link 72*b* and actuator 71*b* controlled by an ECU 60 is connected to a pivotal link 73*b* hingedly coupled to the middle portion of valve link 72*b*.

In this configuration, actuator 71*a* and valve link 72*b* are preferably hinged.

In this case, actuator 71*a* operated by ECU 60 simultaneously changes the open amount of EGR valve 33 and channel control valve 40 by pulling or pushing the pivotal link 73*b* hingedly coupled to valve link 72*b*.

The post-operation state of FIG. 5 shows when EGR valve 33 is fully open and channel control valve 40 is fully closed.

Figure 6:
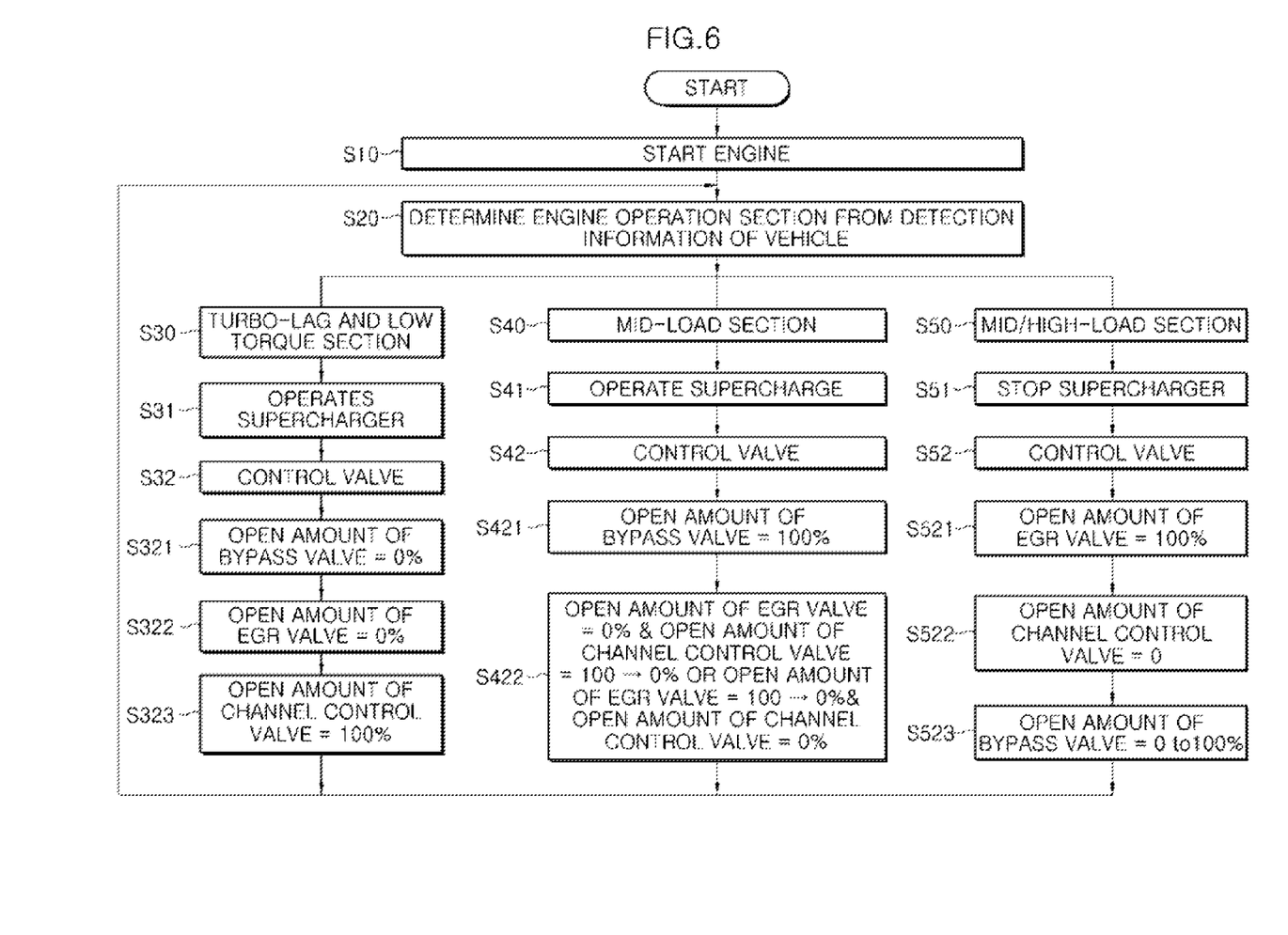
FIG. 6 is a flowchart showing a method of improving fuel efficiency using the turbocharger-based engine system according to an exemplary embodiment of the present invention.

FIG. 6 shows a logic for improving fuel efficiency that uses the turbocharger-based engine systems according to the first exemplary embodiment and the second exemplary embodiment of the present invention.

As in step S10, as the engine operates, vehicle information according to the operation of the engine is inputted to ECU 60 from various sensors.

Step S20 is a process of determining the present engine operation section of the vehicle from the vehicle information.

In the exemplary embodiment, the operation section is divided into at least three parts, such that it is possible to improve availability in the low-speed/high-load section by differently controlling EGR valve 33, channel control valve 40, and bypass valve 50 for the operation sections such that turbo-lag is reduced by super chargers 20 and 200 and largely increase the ratio of improvement in fuel efficiency in the low-speed/high-load section by LP-EGR 30 operating with supercharger 20.

The three divided operation sections are a turbo-lag and low torque section, a mid-load section, and a mid/high-load section.

Step S30 is a process of control for the turbo-lag and low-torque section, in which superchargers 20 and 200 operate, as in Step S31, and EGR valve 33, channel control valve 40, and bypass valve 50 are optimally controlled, as in step S321 to step S323 from step S32.

Figure 7A:
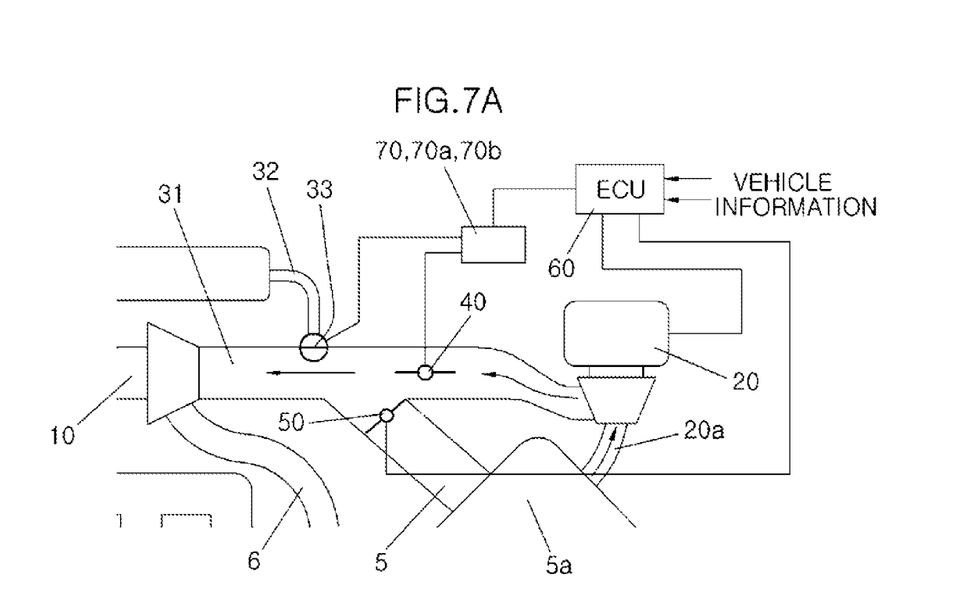
FIGS. 7A to 7C are operation view of a turbocharger-based engine system according to an exemplary embodiment of the present invention.

FIG. 7A shows that the engine system is controlled in the turbo-lag and low torque section, which is implemented in step S30.

As shown in the figure, in the engine system, ECU 60 controls not separately EGR valve 33 and channel control valve 40, but integrally controls EGR valve 33 and channel control valve 40, using valve operating units 70, 70*a*, and 70*b*.

In the exemplary embodiment, the difference depends on whether ECU 60 directly controls channel control valve 40 to be fully opened in the opposite way when directly controlling EGR valve 33 to be fully closed or whether valve links 72, 72*a*, and 72*b* where EGR valve 33 and channel control valve 40 are connected are operated by actuators 71, 71*a*, and 71*b*.

When the engine system is controlled in the turbo-lag and low torque section, as in step S30, superchargers 20 and 200 suck the external air from external air line 5 of intake system 4 and send it to EGR line 31 of LP-EGR 30.

In this state, bypass valve 50 is fully closed and the external air is not introduced through intake system 4, as in step S321, and EGR valve 33 is also fully closed and the exhaust gas is not introduced through LP-EGR 30, as in step S322, whereas channel control valve 40 is fully opened, as in step S323, such that only the external air introduced by superchargers 20 and 200 is supplied to turbocharger 10.

Step S40 is a process of control for the mid-load section, in which superchargers 20 and 200 operate, as in Step S421, and EGR valve 33, channel control valve 40, and bypass valve 50 are optimally controlled, as in step S321 to step S323 from step S32.

Figure 7B:
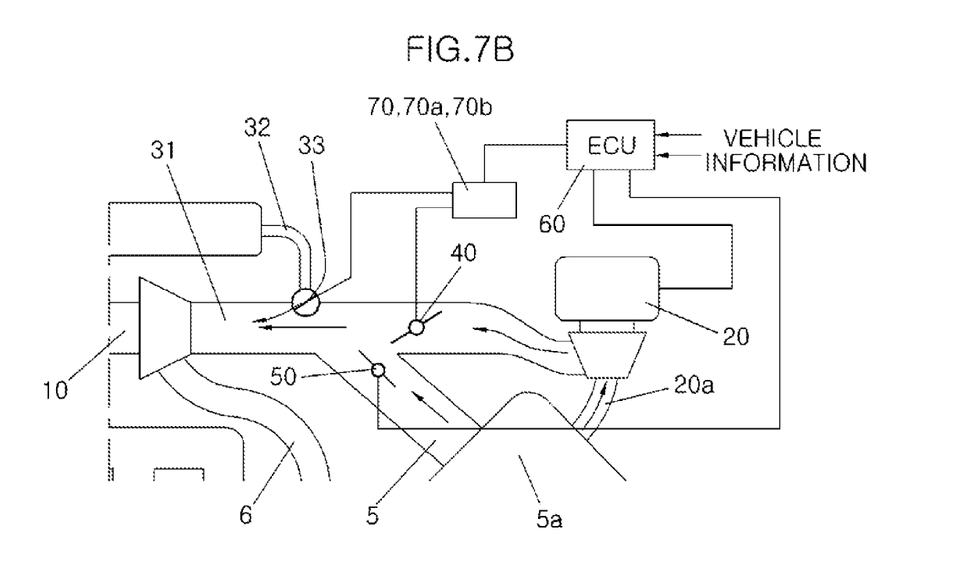

FIG. 7B shows that the engine system is controlled in the mid-load section, which is implemented in step S40.

As shown in the figure, the flow of external air through intake system 4, another flow of external air by operation of superchargers 20 and 200, and the flow of the exhaust gas through LP-EGR 30 are formed in EGR line 31 connected to turbocharger 10.

In this state, bypass valve 50 is fully opened and the external air is introduced through intake system 4 at the largest level, as in step S421, while EGR valve 33 and channel control valve 40 operate in the opposite ways, as in step S422, such that the flow of external air through superchargers 20 and 200 is not introduced or implemented in the opposite way when the flow rate of exhaust gas increases.

That is, when the EGR valve 33 is fully closed, the channel control valve 40 that has been fully open is fully closed, or when channel control valve 40 is fully closed, EGR valve 33 that has been fully open is fully closed.

Therefore, the flow rate of the external air flowing through intake system 4 is constant, while the flow rate of the exhaust gas flowing through EGR valve 33 and the flow rate of the external air flowing through channel control valve 40 are variably controlled.

Step S50 is a process of control for the mid/high-load section, in which superchargers 20 and 200 are not operated, as in Step S51, and EGR valve 33, channel control valve 40, and bypass valve 50 are optimally controlled, as in step S521 to step S523 from step S52.

Figure 7C:
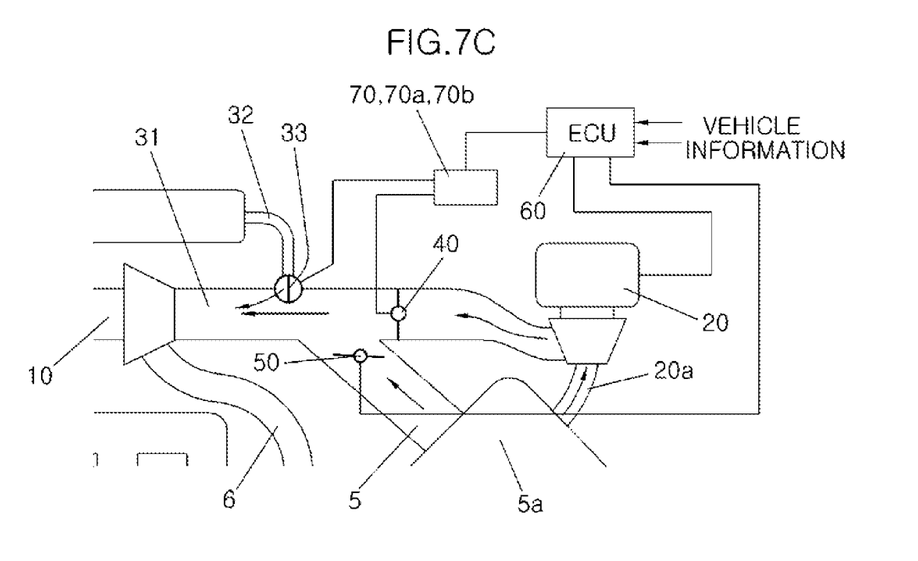

FIG. 7C shows that the engine system is controlled in the mid/high-load section, which is implemented in step S50.

As shown in the figure, the flow of the external gas flowing through LP-EGR 30 and the flow of the external air flowing through intake system 4 are formed in EGR line 31 connected to turbocharger 10, while superchargers 20 and 200 are not operated, such that the flow of external air due to the operation of superchargers 20 and 200 is not formed.

In this state, EGR valve 33 is fully opened and the exhaust gas is introduced through LP-EGR 30 at the maximum level, as in step S521, while channel control valve 40 is fully closed and bypass valve 50 that has been fully closed is fully opened, such that the flow rate of the external air flowing through intake system 4 is variably controlled, as in step S522.

As described above, the engine system according to an exemplary embodiment of the present invention includes electric or mechanical superchargers 20 and 200 and LP-EGR 30, basically in addition to turbocharger 10, and EGR valve 33, channel control valve 40, and bypass valve 50, which control the flow rate of the external air and the exhaust gas, are integrally operated, such that it is possible to prevent deterioration of the layout of the engine room and achieve a downsized engine system.

In the engine system according to an exemplary embodiment of the present invention, since EGR valve 33, channel control valve 40, and bypass valve 50, which control the flow rate of the external air and the exhaust gas, are optimally controlled for each of the turbo-lag and low torque section, the mid-load section, and the mid/high-load section, turbo-lag is reduced by superchargers 20 and 200, such that it is possible to considerably increase the ratio of fuel efficiency improvement in the low-speed/high-load section, using LP-EGR 30 operating with supercharger 20, in addition to improving availability for the low-speed/high-load section.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A turbocharger-based engine system, comprising:
    an intake system that includes an air cleaner and supplies an external air into an engine;
    an exhaust system that includes at least one or more filter and discharges an exhaust gas discharged from the engine to the outside;
    a turbocharger that is operated by the exhaust gas and oversupplies the external air supplied into the air cleaner;
    a supercharger that forms another flow of external air diverging from an external air flow section of the intake system;
    an exhaust gas recirculation system that includes an exhaust gas recirculation line connecting the exhaust system to a compressor of the turbocharger to send the flow of the exhaust gas diverging from the exhaust system to the turbocharger; and
    a valve unit that changes a mixing ratio of the exhaust gas and the external gas oversupplied through the turbocharger by changing the flow of the external air, the another flow of external air, and the flow of the exhaust gas at a front end of the compressor in the turbocharger by control of an engine control unit;
    wherein the valve unit includes:
        an exhaust gas recirculation valve that selectively allows the exhaust gas diverging from an exhaust line fluid-connected to the turbocharger to flow to the exhaust gas recirculation line;
        a bypass valve that allows the external air introduced through an intake line of the intake system to flow to the exhaust gas recirculation line, wherein the air cleaner is fluid-connected to the intake line; and
        a channel control valve that allows the another flow of external air sucked through the supercharger to send to the exhaust gas recirculation line; and
            wherein the exhaust gas recirculation valve and the channel control valve are integrally opened/closed in the opposite way and the bypass valve is independently opened/closed.

2. The turbocharger-based engine system as defined in claim 1, wherein the supercharger forms the another flow of external air diverging from the flow of the external air that is formed at a rear end of the air cleaner of the intake system and directly sends the flow of external air to the exhaust gas coming from the exhaust gas recirculation line.

3. The turbocharger-based engine system as defined in claim 2, wherein the supercharger is an electric supercharger.

4. The turbocharger-based engine system as defined in claim 1, wherein the supercharger forms the another flow of external air diverging from the flow of the external air that is formed at a rear end of the air cleaner of the intake system and connects the flow of external air from an intake connection line diverging from the supercharger to the exhaust gas coming from the exhaust gas recirculation line.

5. The turbocharger-based engine system as defined in claim 4, wherein the supercharger is a mechanical supercharger using the power from the engine.

6. The turbocharger-based engine system as defined in claim 1, wherein the EGR is a low-pressure exhaust gas recirculation and the exhaust gas recirculation line diverges from a rear end of the filter of the exhaust system.

7. The turbocharger-based engine system as defined in claim 1, wherein the exhaust gas recirculation valve and the channel control valve are operated by a valve operating unit that is controlled by the engine control unit.

8. The turbocharger-based engine system as defined in claim 7, wherein the valve operating unit includes:
    an actuator that directly changes the open amount of any one of the exhaust gas recirculation valve and the channel control valve; and
    a valve link that connects the exhaust gas recirculation valve or the channel control valve to both ends such that the other valve is closed when any one of the valves is opened.

9. The turbocharger-based engine system as defined in claim 7, wherein the valve operating unit includes:

a valve link that connects the exhaust gas recirculation valve or the channel control valve to both ends such that the other valve is closed when any one of the valves is opened; and an actuator that directly operates the valve link.

10. A method of improving fuel efficiency by using a turbocharger-based engine system, comprising:
a) detecting a vehicle information according to an operation of an engine;
b) determining an engine operation section from the acquired vehicle information wherein the engine operation section is a turbo-lag and low torque section, a mid-load section, and a mid/high-load section;
c) actuating a channel control valve to supply only an external air flowing through a supercharger into the engine, while the engine is operating in the turbo-lag and low torque section,
actuating the channel control valve and controlling an exhaust gas recirculation valve to supply an air gas mixture of the external air flowing through an intake system with one of the external air flowing through the supercharger and the exhaust gas flowing through an exhaust gas recirculation line into the engine, while the engine is operating in the mid-load section, and
actuating a bypass valve in an intake line and controlling the exhaust gas recirculation valve to supply an air gas mixture of the exhaust gas flowing through the exhaust gas recirculation line with the external air flowing through the intake line to the intake system into the engine, and actuating the channel control valve for not supplying the external air through the supercharger, while the engine is operating in the mid/high-load section.

11. The method as defined in claim 10, wherein the step of actuating the channel control valve while the engine is operating in the turbo lag and low torque section including:
fully opening the channel control valve at the joint of the exhaust gas recirculation line to allow all the external air sucked from the intake system, while the bypass valve at the joint of the exhaust gas recirculation line where the intake system is connected, is fully closed, and the exhaust gas recirculation valve in the exhaust gas recirculation line is fully closed.

12. The method as defined in claim 10, wherein the step of actuating the bypass valve while the engine is operating in the mid-load section including:
fully opening the bypass valve, while the exhaust gas recirculation valve disposed in the exhaust gas recirculation line is fully opened or operated in the opposite way when the channel control valve at the joint of the exhaust gas recirculation line where the supercharger is connected, is fully closed.

13. The method as defined in claim 12, wherein when the channel control valve or the exhaust gas recirculation valve are fully opened, the channel control valve or the exhaust gas recirculation valve are gradually fully closed again.

14. The method as defined in claim 10, wherein the step of controlling the exhaust gas recirculation valve while the engine is operating in the mid/high-load section including:
fully opening the exhaust gas recirculation valve, while the channel control valve at the joint of the exhaust gas recirculation line where the supercharger is connected, is fully closed, and the bypass valve that has been fully closed at the joint of the exhaust gas recirculation line where the intake system is connected, is gradually fully opened.

* * * * *